(12) United States Patent
Levow (10) Patent No.: US 7,788,291 B2
(45) Date of Patent: Aug. 31, 2010

(54) WEB ACCELERATOR APPARATUS, SYSTEM, AND METHOD

(75) Inventor: Zachary Levow, Palo Alto, CA (US)

(73) Assignee: Barracuda Networks, Inc., Campbell, CA (US)

( * ) Notice: Subject to any disclaimer, the term of this patent is extended or adjusted under 35 U.S.C. 154(b) by 301 days.

(21) Appl. No.: 11/861,034

(22) Filed: Sep. 25, 2007

(65) Prior Publication Data

US 2009/0083217 A1 Mar. 26, 2009

(51) Int. Cl.
*G06F 7/00* (2006.01)
*G06F 17/30* (2006.01)

(52) U.S. Cl. .................................................. 707/803
(58) Field of Classification Search ................. None
See application file for complete search history.

(56) References Cited

U.S. PATENT DOCUMENTS

| 6,055,569 | A  | * | 4/2000  | O'Brien et al. | 709/223 |
| 2002/0178232 | A1 | * | 11/2002 | Ferguson | 709/217 |
| 2006/0294223 | A1 | * | 12/2006 | Glasgow et al. | 709/224 |

* cited by examiner

*Primary Examiner*—Uyen T. Le
(74) *Attorney, Agent, or Firm*—Patentry (57) ABSTRACT

A system, apparatus, and method for accelerating display of frequently accessed slowly changing static content by causing a client having cache to actively request new content from a server and influencing caching policy at the client.

37 Claims, 7 Drawing Sheets

WEB ACCELERATOR APPARATUS, SYSTEM, AND METHOD

BACKGROUND

The hypertext transfer protocol is a standard for the world wide web and is referred to as HTTP by those skilled in the art of using the global communications system known as the Internet. HTTP is typically used for distributed information systems, where performance can be improved by the use of response caches. The HTTP protocol includes a number of elements intended to make caching work as well as possible. Because these elements are inextricable from other aspects of the protocol, and because they interact with each other, it is useful to describe the basic caching design of HTTP separately from the detailed descriptions of methods, headers, response codes, etc.

Caching would be useless if it did not significantly improve performance. The goal of caching in HTTP is to eliminate the need to send requests in many cases, and to eliminate the need to send full responses in many other cases. The former reduces the number of network round-trips required for many operations; an "expiration" mechanism is defined for this purpose. The latter reduces network bandwidth requirements; a "validation" mechanism is defined for this purpose.

The basic cache mechanisms in HTTP (server-specified expiration times and validators) are implicit directives to caches. In some cases, a server or client might need to provide explicit directives to the HTTP caches using the Cache-Control header for this purpose. The Cache-Control header allows a client or server to transmit a variety of directives in either requests or responses. These directives typically override the default caching algorithms.

HTTP caching works best when caches can entirely avoid making requests to the origin server. The primary mechanism for avoiding requests is for an origin server to provide an explicit expiration time in the future, indicating that a response MAY be used to satisfy subsequent requests. In other words, a cache can quickly return a fresh response.

Server administrators may assign future explicit expiration times to responses in the belief that the entity is not likely to change, in a semantically significant way, before the expiration time is reached. This normally preserves semantic transparency, as long as the server's expiration times are carefully chosen.

Figure 1:
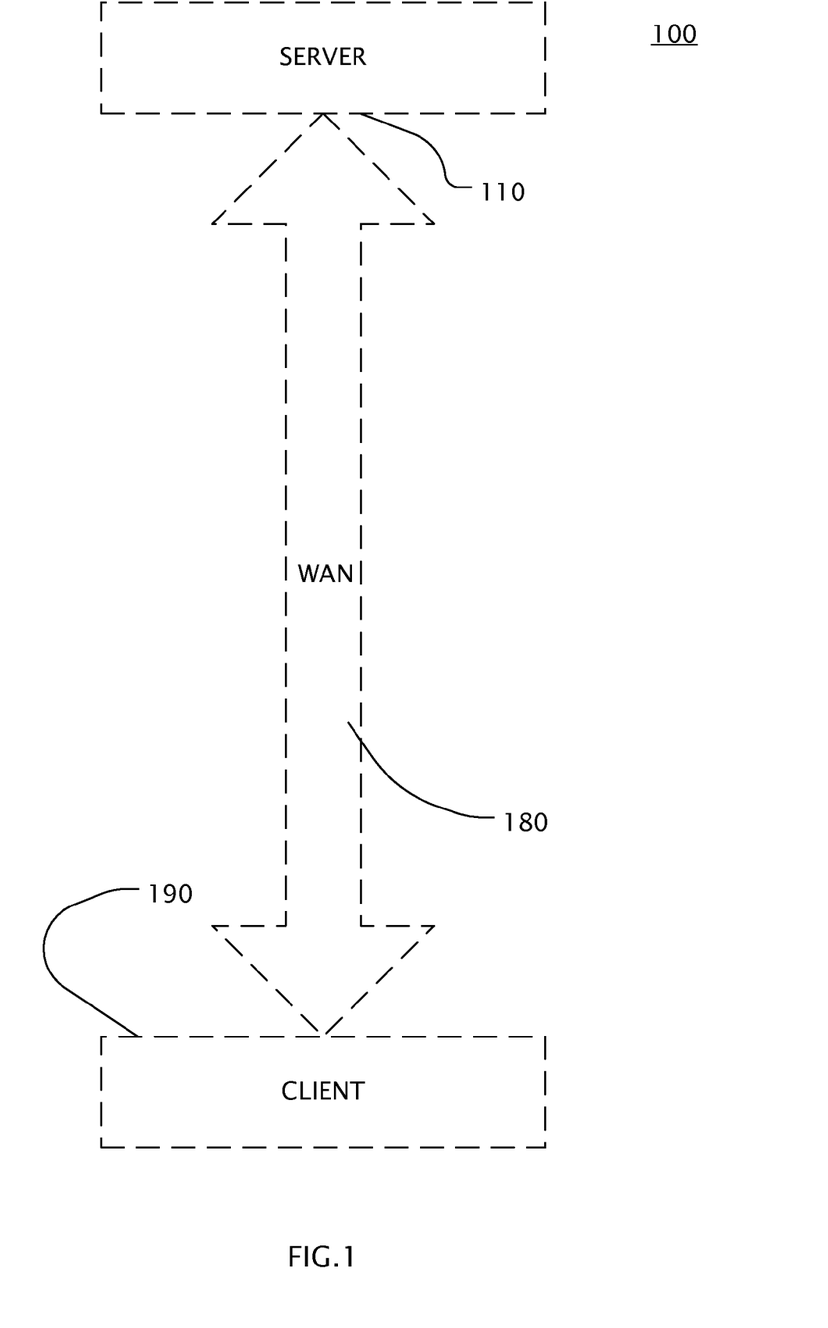
FIG. 1 is a conventional block diagram of client server.

When a hypertext document such as a web page is requested via the Hypertext Transfer Protocol (HTTP) a server 110 in FIG. 1 locates a file based on the requested Uniform Resource Locator (URL). This file may be a regular file or a program. In the second case, the server may (depending on its configuration) run the program, sending its output as the required page. A query string is a part of the URL which is passed to the program. Its use permits data to be passed from the HTTP client 190 (often a browser) to the program which generates the hypertext document.

A program receiving a query string can ignore part or all of it. If the requested URL corresponds to a file and not to a program, the whole query string is usually ignored.

The problem being solved herein is two-fold: the validation step still requires a network 180 round-trip and its latency reduces the performance observed by the user of the client 190 system; and many web server 110 administrators choose not to employ the expiration mechanism because of several reasons primarily that they have lost control of the cached item and cannot cause it to be un-cached, in addition to the time necessary to decide whether to cache or not to cache and determine an appropriate caching policy. These questions are hard to answer correctly, easy to answer incorrectly, and embarrassing to explain to senior management when errors or omissions cannot be fixed.

SUMMARY OF THE INVENTION

Figure 7:
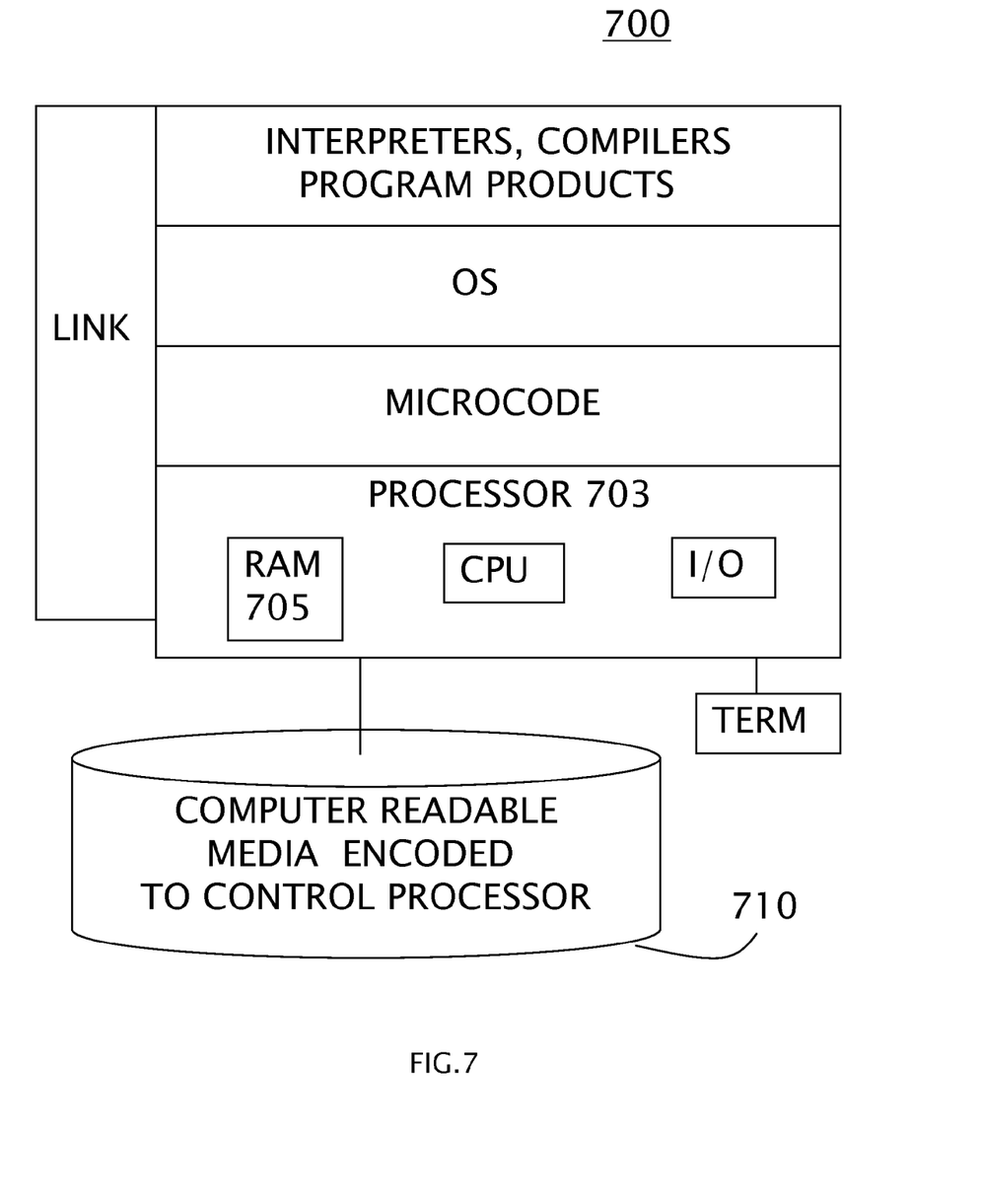
FIG. 7 is a block diagram illustrative of a non-limiting exemplary conventional server or processor.

The present invention is an apparatus which comprises a processor 703 in FIG. 7 and computer readable media 710 tangibly embodying the following method. The present invention is a method for web acceleration by minimizing latency in traffic concerned with large, frequently accessed, infrequently changing objects such as images, scripts, Java, ActiveX, multimedia, animations, flash, music, and video as well as their validation. Within this patent application we define this class of objects as web acceleration objects (WAO).

When a hypertext document is requested by a client, the method replaces a url reference to a WAO with a trl. A hypertext document is defined as a document having a url link to a WAO or another hypertext document. The trl is herein defined in this patent application as a transition reference locator. A transition reference locator incorporates the url with a ttag that distinguishes one version of the WAO from a second version of the WAO. The modified hypertext document with the trl is sent to the requesting client. A ttag is herein defined in this patent application as a transition tag.

After initialization, the ttag is recomputed only when the WAO changes and subsequent requests for the hypertext document containing the trl references a new ttag. As a result the new version of the WAO is requested and cached by the client.

DETAILED DISCLOSURE

The present patent application defines a class of Web Acceleration Objects (WAO) having the characteristic of frequently accessed, slowly changing static content. The class is illustrated but not restricted to the following: gifs, animated gifs, jpegs, bitmaps, scripts, images, photographs, multimedia, flash, music, audio recordings, video recordings, movies, ring tones, avatars, and applets.

Figure 4:
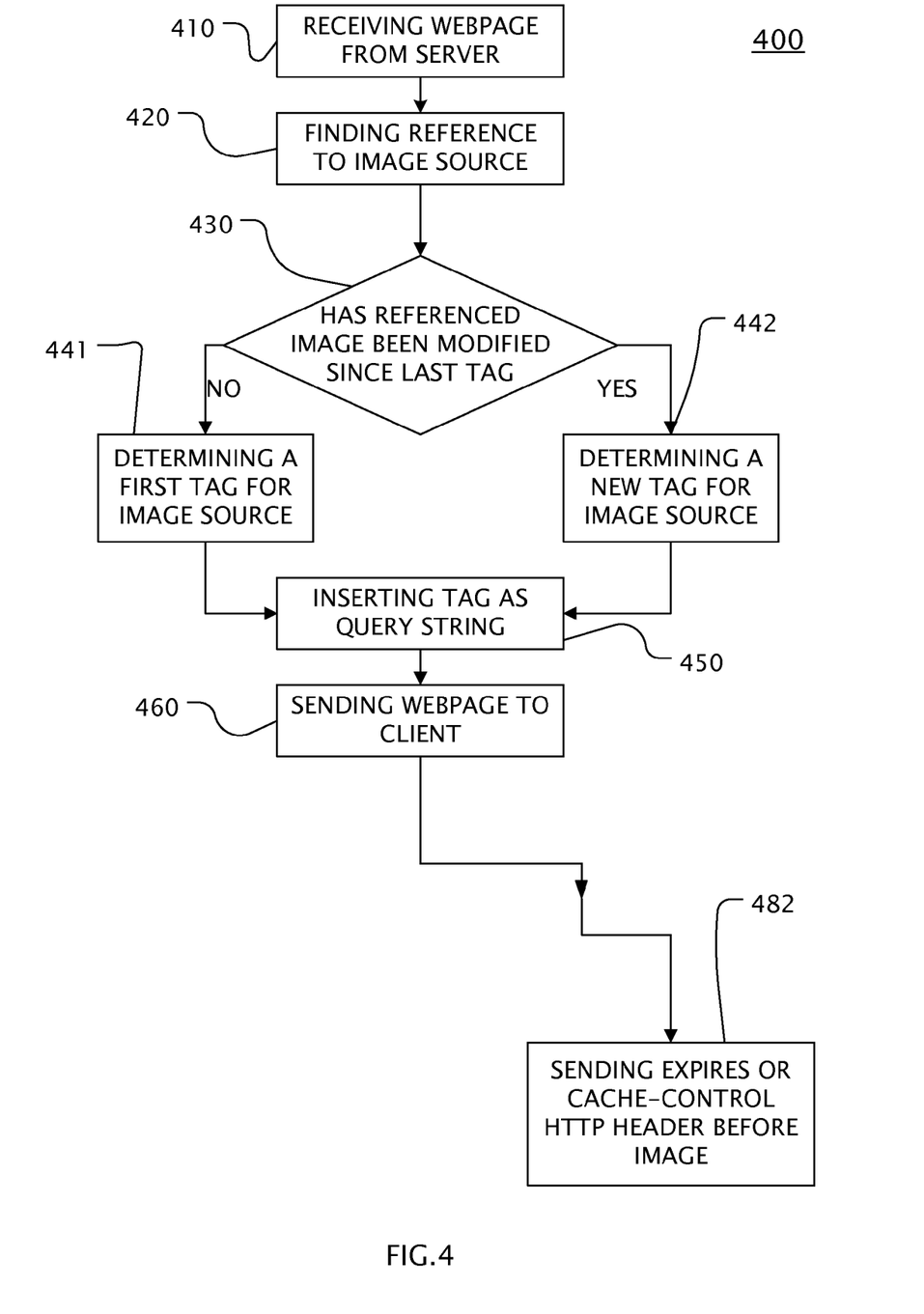
FIG. 4 is a flowchart illustrating a third embodiment.
Figure 5:
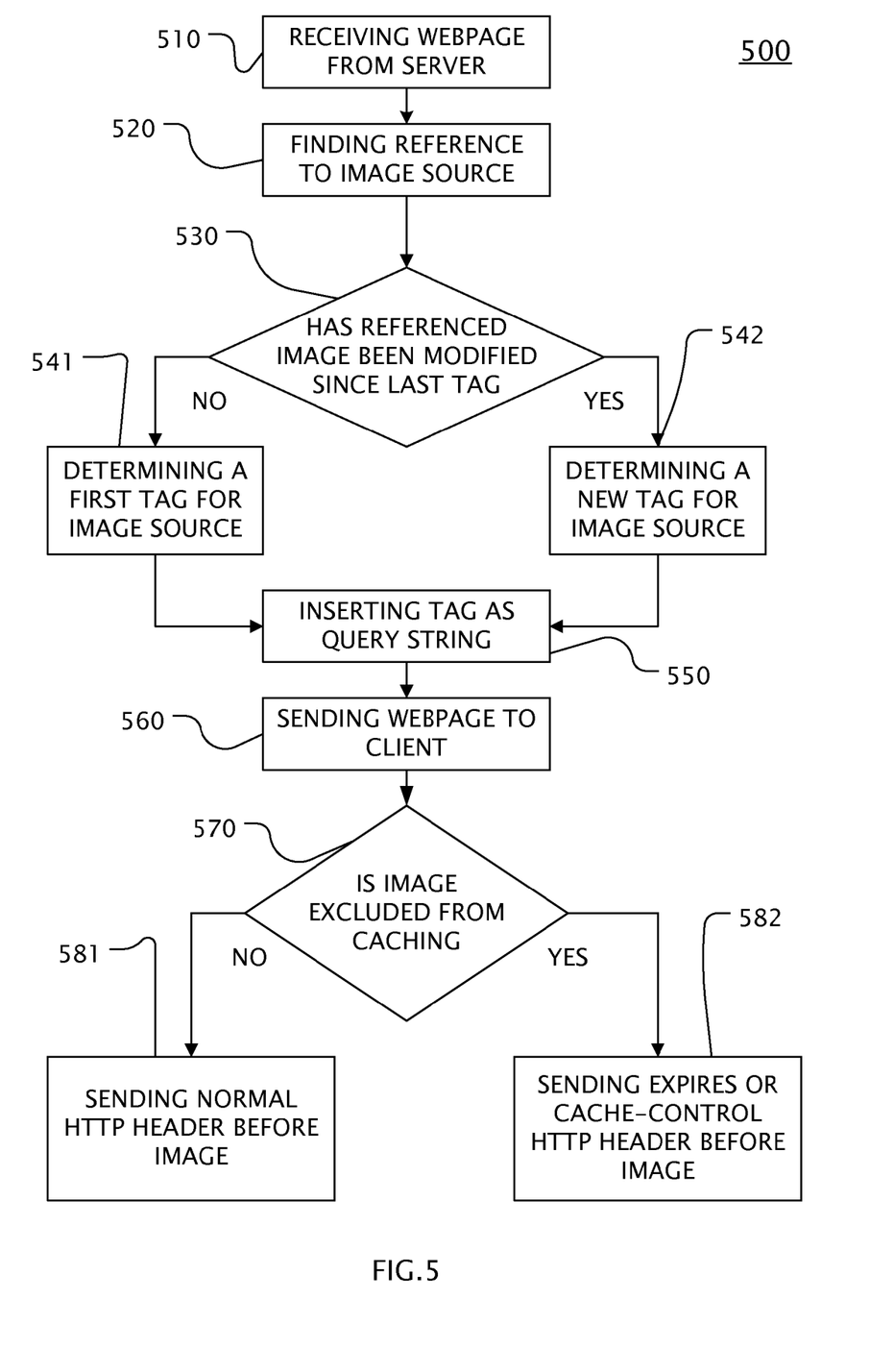
FIG. 5 is a flowchart illustrating a preferred embodiment.

An embodiment of the present invention 400 in FIG. 4 comprises
receiving a WAO, such as an image, from a server 110 in FIG. 1 in response to an http
request,
setting an http header to influence caching behavior 482, and
relaying the resulting http header and WAO to the client 190 in FIG. 1 making the http request;
receiving a WAO from a server,
computing a ttag to distinguish 430 a first version of the WAO 441 from a second version of the WAO 442 having a common uniform resource locator (URL), and storing a ttag concatenated to the URL as part or all of a query string 450;

receiving a hypertext document from a server in response to an http request 410 510, finding a URL reference to a WAO 420 520, and replacing the URL with a ttag concatenated to the URL as part or all of a query string 450, and relaying 460 the resulting modified hypertext document to the client 190 in FIG. 1 making the http request.

Certain WAO may be chosen to be excluded or included as candidates for caching. The URL of a WAO which should be fetched from the origin and not from a cache may be stored and checked when setting http headers to influence caching behavior.

A WAO has a ttag computed to distinguish a first version from a second version. A WAO is checked to determine if it has been modified since the last ttag computation 430 in FIG. 4 and if so, a new ttag is computed 442. In an embodiment checking on each request is suspended until expiration of a minimum interval. The new ttag will be used to modify a hypertext document containing a url reference to the WAO subsequently requested by a client.

The changed ttag will cause an http client with caching capability to distinguish between the cached WAO and a newer version of the WAO, resulting in a http request for the newer WAO. Another embodiment of the invention is to change the actual path or filename of the WAO. This has the disadvantage that the server left to its own devices would be unable to find the requested file. The preferred embodiment is to concatenate a query string (which is simply ignored by the server) to a URL which is accessible to the server.

Figure 3:
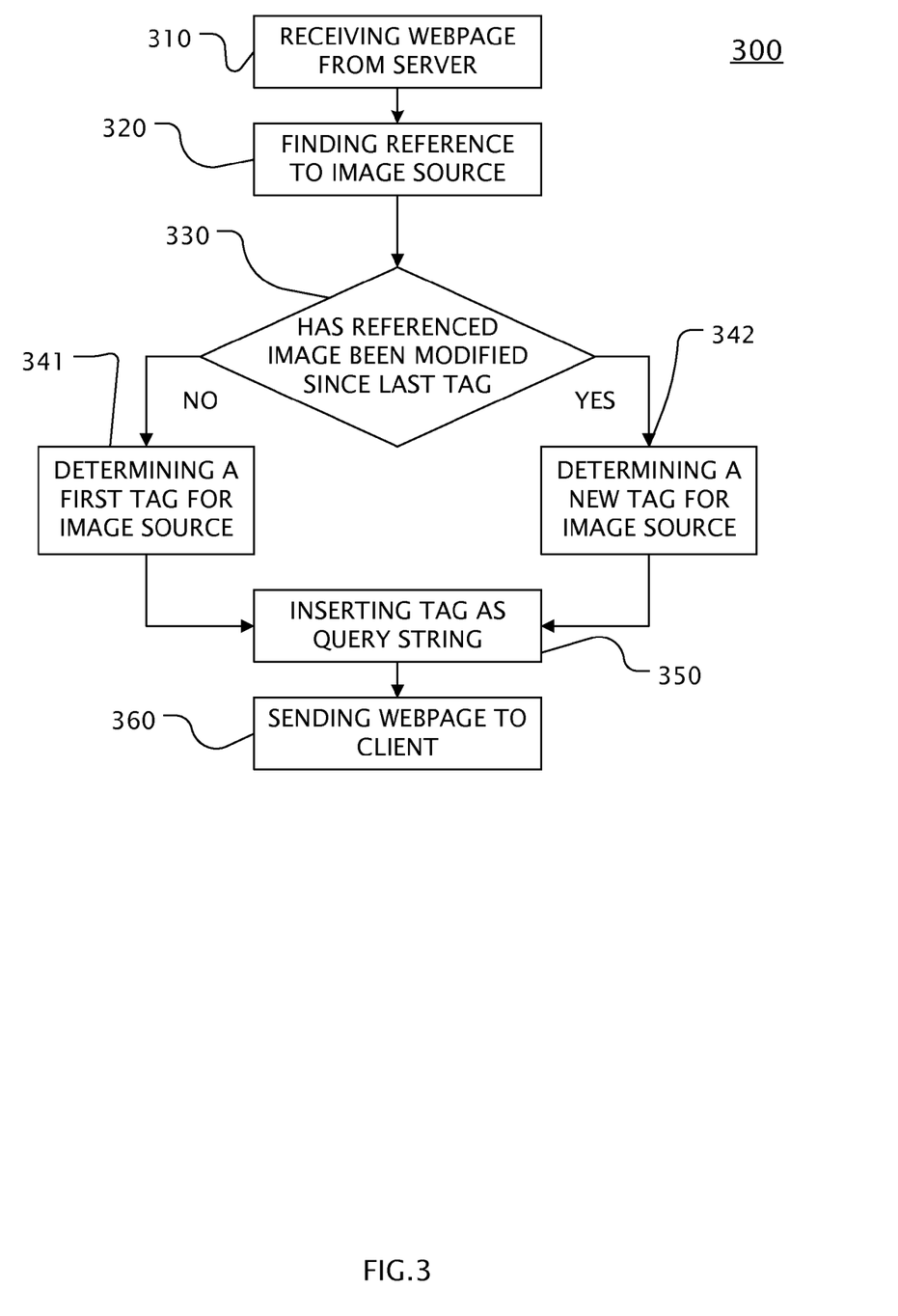
FIG. 3 is a flowchart illustrating a second embodiment.

In an embodiment of the present invention 300 in FIG. 3, a program product tangibly encoded on an electronically readable medium 710 in FIG. 7 provides instructions to a processor 703 causing an http client with caching capability to request the current version of a WAO. The instructions adapt the processor 703 to perform the following processes:

receiving a hypertext document containing hypertext markup language requested by a client 190 from a server 110, such as a web page 310;

finding in the hypertext document a url reference to a WAO 320;

replacing the url reference 350 to a WAO with a trl reference to the WAO wherein a trl reference contains a ttag to distinguish a first version of the WAO from a second version of the WAO 330; and transmitting a hypertext document 360 containing a trl to a client.

While image files are common candidates for web acceleration, the general class of WAOs include an image file, a Java script, a script, an audio file, a video file, flash, shockwave, multimedia, and a portable document file.

The present invention further comprises the process of determining a ttag 341 342 which can be done by a number of ways understood by those skilled in the art. Examples include hashing the content, computing a checksum, incrementing a counter 705 after initialization, reading http date, copying a filedate, and calling a pseudo-random number utility.

The invention further comprises automatically influencing caching policy on a WAO at a client. This is a process that is unwieldy and complex for server administrators and can easily have negative consequences if done poorly. By automatically transmitting, before the WAO, illustrated by but not restricted to, the following list of http headers 482: expires, maxage, s-maxage, public, no-cache, no-store, ettag, and last-modified; the invention can apply heuristic selection of caching policy.

One heuristic is to measure the frequency of requests for a hypertext document over a period of time; select an hypertext document based on higher than average demand; find the url references to WAOs on the hypertext document; and transmit an http header for each of the WAOs that would delay loading of that page. Another approach is to set a default header for the most recently used url requests and present an administrator a control panel to view and override the default header:url pairs accumulated since start.

Figure 6:
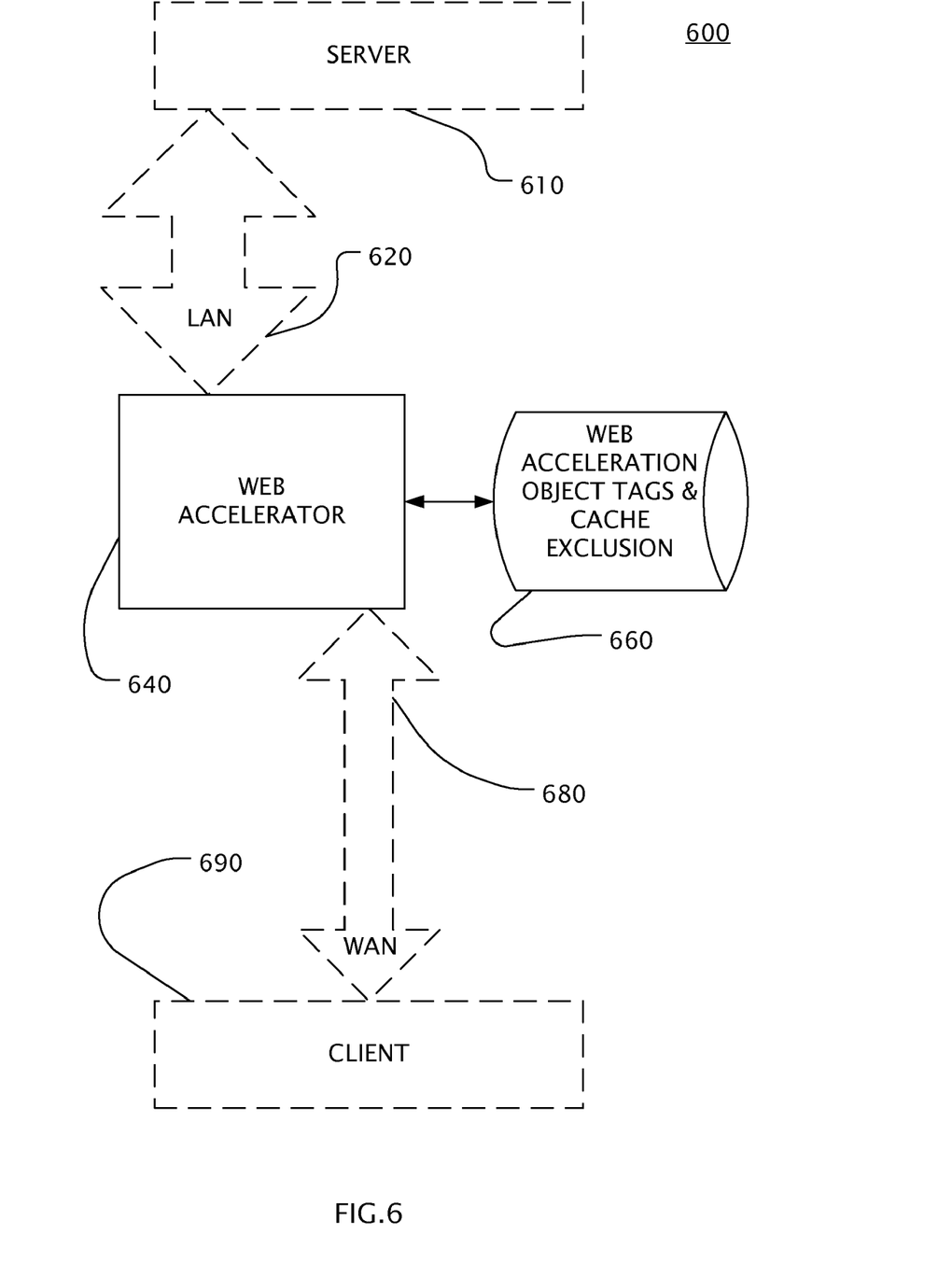
FIG. 6 is a block diagram of the system incorporating the present invention.

In some cases there are objects not suitable for caching. An example is a non-visible WAO which is used to measure the number of times a page is viewed. To set an http header appropriately the invention displays a list of WAOs requested;

displays a data input like a checkbox or radio button to exclude each WAO from caching;

stores the result of user input on excluding a WAO from caching 660 in FIG. 6; and then transmits, before the WAO, an http header which is adapted to influence the caching policy at the client not to store the WAO 581 582 in FIG. 5.

The invention further comprises observing frequent changes to query strings or intentional cache avoidance by the server and automatically setting logic 570 in FIG. 5 to transmit or modify an http header to influence the client not to cache the WAO and adding the WAO to a list of WAO not to be cached 660 in FIG. 6.

An embodiment 500 in FIG. 5 of this invention results in transmitting 581 582 in FIG. 5, before a requested WAO, an http Expires header and a future http date wherein a future http date is computed in relation to the date of the request for the WAO. This end result is provided to illustrate the outcome of performing the invention.

To simplify installation and configuration of the invention, it can be provided as an appliance 700, an integrated turnkey hardware product having plug and play characteristics. In that embodiment 600 in FIG. 6 the invention is an apparatus 640 for accelerating the presentation of hypertext documents without requiring highly skilled server administration for deployment, comprising:

at least one port attaching to a network 620 680 with at least one server 610 and at least one client 690;

means for modifying 550 a hypertext document received from the server 510, and transmitting a modified hypertext document 560 to a client;

wherein means for modifying a hypertext document 700 comprise a processor 703 adapted to perform the processes of finding a url reference 520, and replacing the url reference with a trl reference 550 wherein a trl reference comprises a ttag and the url reference.

An example of a high bandwidth port and a low bandwidth port is connection between a wired network 620 of servers 610 and a wireless network 680 of clients 690 where the apparatus 640 operates as a gateway.

The apparatus may have means for computing a ttag wherein means for computing a ttag comprises a processor 703 adapted to perform the processes of determining that the content of a WAO has changed and generating a ttag to distinguish a first version of a WAO from a second version of a WAO.

The method of generating a ttag is illustrated but not restricted by the following list: a hash of the content, a checksum, a incremented counter 705, an http date, a copy of filedate of the WAO, and a pseudo-random number. An example of a ttag might be VER=0.

In an embodiment 500 in FIG. 5 of the present invention the apparatus optionally includes means for influencing caching policy of a WAO at a client wherein means for influencing caching policy of a WAO at a client comprises a processor 703 adapted to perform the process of transmitting, before a requested WAO, an http Expires header 582 and a future http date wherein a future http date is computed in relation to the date of the request for the WAO. Other embodiments may use the cache-control headers. Other embodiments may advocate use of metatags or pragmas with some degree of success.

The present invention is distinguished from conventional web caching by independently determining a ttag to distinguish a first version from a second version of a WAO having a common url. An automated process checks the WAO 530 and computes a new ttag 541 542 "if modified since" the last computation.

The invention includes a method for determining a ttag for a WAO, wherein a ttag is a transition tag, and wherein a WAO is a web acceleration object, comprising the steps of waiting until a minimum interval of time has elapsed from a previous determination of a ttag; and checking if the WAO has been modified since the previous determination of the ttag on at least one of the following conditions: after responding to a certain number of http requests for the WAO, after receiving a certain number of http requests for the WAO, after responding to a certain number of http requests for a hypertext document containing a url reference to the WAO, and after receiving a certain number of http requests for a hypertext document containing a url reference to the WAO; and storing the ttag and the time at which the ttag was determined; whereby a change in content from a first version of a WAO to a second version of a WAO can be distinguished.

When a hypertext document which has a url reference to a WAO is requested by a client, the method replaces the url reference with a trl. The trl is defined in this patent application as a transition reference locator. A transition reference locator incorporates the url with the ttag that distinguishes one version of the WAO from a second version of the WAO. The modified hypertext document with the trl is sent to the requesting client. Only when the WAO changes, is the ttag recomputed and subsequent requests for that hypertext document references a new trl. As a result the new version of the WAO will be requested by an http client and cached.

As each WAO is http requested by a client, the list of objects excluded from the class of WAO 660 in FIG. 6 is checked, and an http header is set to influence caching behavior. Several directives are available to control how long the caching may continue without validation. It is an objective of the present invention to control the refreshing of the cache through changing trl's prior to any validation event.

CONCLUSION

This invention addresses a problem facing web developers who presently must choose between ensuring that the latest content be immediately available to their readers or enabling better performance and user satisfaction. If slowly changing, frequently accessed static content such as large images could be flagged automatically as candidates for long term caching yet retain a characteristic allowing the origin to replace anything in cache when necessary, both developers and users would benefit by reduced latency, congestion, lower bandwidth costs, and management overhead.

An embodiment of the present invention is a system 600 in FIG. 6 and method for accelerating the delivery of web content comprising a web accelerator 640 coupled to a server 610 and to a client 690 through a network 620 680, wherein the web accelerator comprises means for influencing caching policy of a WAO at the client, means for distinguishing a first version of the WAO from a second version of the WAO 660, and means for modifying a hypertext document by changing references to a WAO to distinguish a first version from a second version of the WAO, whereby the client is caused to request a second version of the WAO.

Hypertext documents are used to signal new versions of frequently accessed, slowly changing objects such as large images which can be downloaded and stored according to improved caching policies which are automatically provided.

Figure 2:
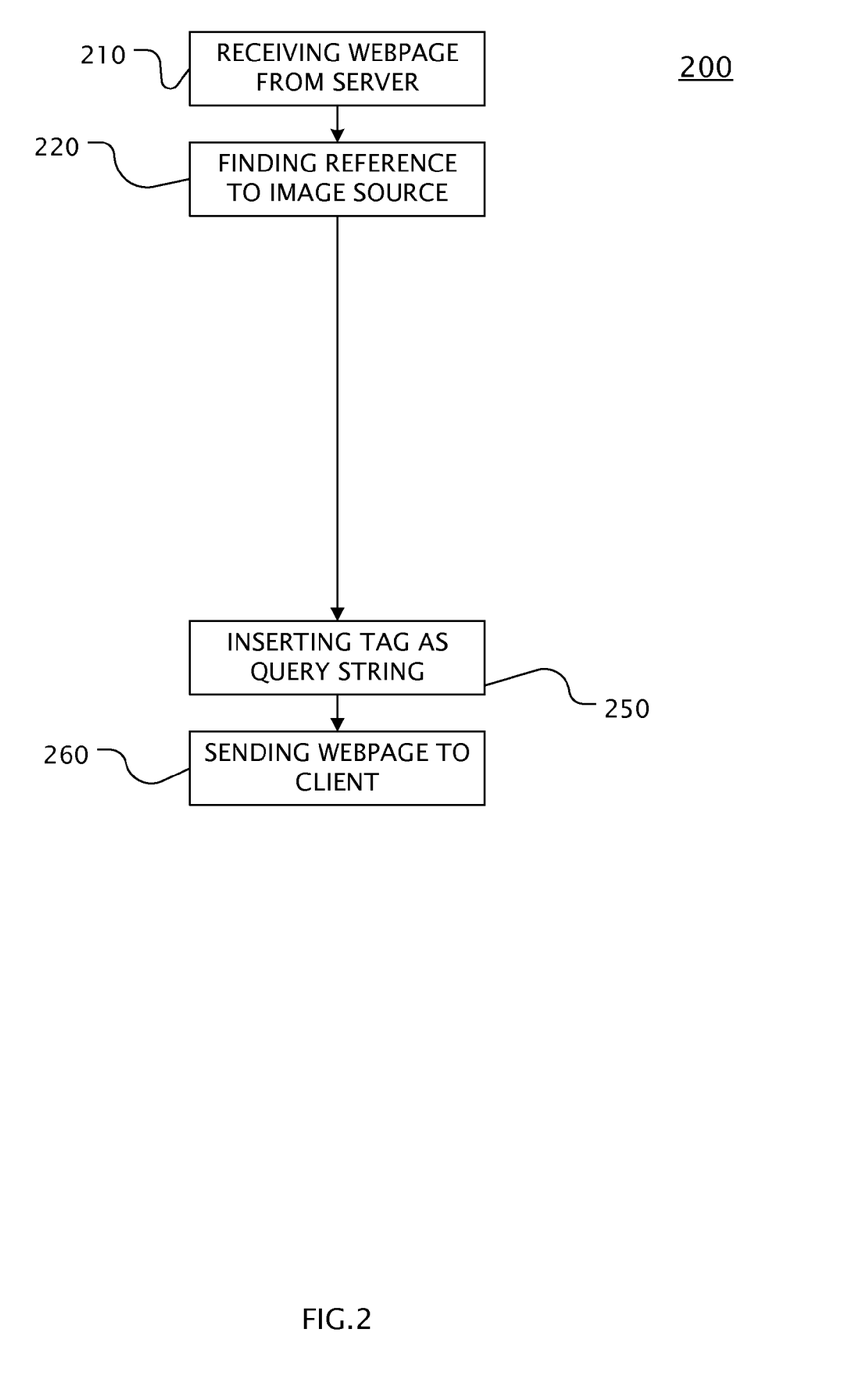
FIG. 2 is a flowchart illustrating a first embodiment.

In summary the invention includes a method 200 in FIG. 2 for causing the current version of WAOs to be requested by clients having caches comprising the following processes: receiving a hypertext document 210 requested by a client from a server; finding in the hypertext document a url reference to a web acceleration object (WAO) 220; replacing the url reference to a WAO with a trl reference to the WAO wherein a url is a uniform reference locator and a trl reference contains a url and ttag to distinguish a first version of the WAO from a second version of the WAO 250; and transmitting a hypertext document containing a trl to a client 260.

The scope of the invention includes all modification, design variations, combinations, and equivalents that would be apparent to persons skilled in the art, and the preceding description of the invention and its preferred embodiments is not to be construed as exclusive of such.

What is claimed is:

1. An integrated hardware product having plug and play characteristics, comprising an apparatus for accelerating the delivery of web content comprising at least one port attaching to a network, comprising a processor adapted to find a uniform resource locator (url) in a hypertext document received in said apparatus, and replace the url with a transition reference locator (trl), the trl comprising a transition tag (ttag) and the url reference, the apparatus coupled to a first network having a server and the apparatus further coupled to a second network having a client, whereby the client is caused to request a second version of a web acceleration object having the characteristic of frequently accessed, infrequently changing, static content.

2. A method for determining and deploying a transition tag (ttag) for a web acceleration object (WAO) referenced in a hypertext document received in an apparatus comprising a processor configured to find and replace a url in said document with a trl comprising said ttag, comprising the steps of waiting until a minimum interval of time has elapsed from a previous determination; and checking if the WAO has been modified since the previous determination of the ttag on at least one of the following conditions:

after responding to a number of http requests for the WAO, after receiving a number of http requests for the WAO, after responding to a number of http requests for a hypertext document containing a url reference to the WAO, after receiving a number of http requests for a hypertext document containing a url reference to the WAO;

storing the ttag and the time at which the ttag was determined; whereby a change in content from a first version of a WAO to a second version of a WAO can be distinguished; and transforming said hypertext document by finding the at least one url referencing said WAO, transforming said url into a trl comprising said ttag, and replacing said url with said trl.

3. The method of claim 2 for determining a ttag for a WAO further comprising computing a checksum of the contents of the WAO.

4. The method of claim 2 for determining a ttag for a WAO further comprising reading the filedate of the WAO from the file system.

5. The method of claim 2 for determining a ttag for a WAO further comprising incrementing a counter after initializing the counter.

6. The method of claim 2 for determining a ttag for a WAO further comprising calling a hash function.

7. The method of claim 2 for determining a ttag for a WAO further comprising calling a pseudo-random number function.

8. The method of claim 2 for determining a ttag for a WAO further comprising storing http date.

9. A method for causing a current version of a web acceleration object (WAO) to be requested by clients having caches comprising the following processes:
receiving a hypertext document in a gateway comprising at least one port attaching to a network with at least one client;
finding in the hypertext document a uniform resource locator (url) reference to the web acceleration object (WAO);
replacing the url reference to the WAO with a transition resource locator (trl) reference to the WAO wherein a trl reference contains a url and a transition tag (ttag) to distinguish a first version of the WAO from a second version of the WAO; and
transmitting said hypertext document containing said trl to a client.

10. The method of claim 9 wherein replacing the url reference to a WAO with a trl to the WAO comprises adding a ttag to an existing query string.

11. The method of claim 9 wherein replacing the url reference to a WAO with a trl to the WAO comprises adding a ttag as part of query string.

12. The method of claim 9 wherein replacing the url reference to a WAO with a trl to the WAO comprises adding a ttag as a component to the path of the url.

13. The method of claim 9 wherein replacing the url reference to a WAO with a trl to the WAO comprises adding a ttag as a prefix to a file name.

14. The method of claim 9 wherein replacing the url reference to a WAO with a trl to the WAO comprises adding a ttag as a suffix to a file name.

15. The method of claim 9 wherein replacing the url reference to a WAO with a trl to the WAO comprises modifying a file name with a ttag.

16. The method of claim 9 further comprising a process of influencing caching policy on a WAO.

17. The method of claim 16 wherein the process of influencing caching policy on a WAO comprises transmitting, before the WAO, an hypertext transfer protocol (http) header comprising an expires directive.

18. The method of claim 16 wherein the process of influencing caching policy on a WAO comprises transmitting, before the WAO, an http cache-control header.

19. The method of claim 16 further comprising the process of displaying a list of WAO;
displaying a data input to exclude each WAO from caching;
storing a result of user input on excluding a WAO from caching; and
transmitting, before the WAO, an http header which is adapted to influence the caching policy not to store the WAO.

20. The method of claim 16 wherein a WAO comprises an image file.

21. The method of claim 16 wherein a WAO comprises a script.

22. The method of claim 16 wherein a WAO comprises a multimedia file.

23. The method of claim 16 wherein a WAO comprises a portable document file.

24. An apparatus for accelerating the presentation of hypertext documents without requiring highly skilled server administration for deployment, comprising:
at least one port attaching to a network with at least one server and at least one client;
a processor configured to
find a uniform resource locator (url) reference to a web acceleration object (WAO), and
replace the url reference with a transition resource locator (trl) reference wherein a trl reference comprises the url and a transition tag (ttag) and
transmit a modified hypertext document to the client.

25. The apparatus of claim 24 further comprising a processor configured to perform the processes of determining that the content of a WAO has changed and generating a ttag to distinguish a first version of a WAO from a second version of a WAO.

26. The apparatus of claim 24 further comprising a processor configured to perform the process of transmitting, before a requested WAO, an hypertext transfer protocol (http) Expires header and a future http date wherein a future http date is computed in relation to the date of the request for the WAO.

27. A computer-readable medium storing computer-executable instructions for performing a method for causing a current version of a web acceleration object (WAO) to be requested by a plurality of clients having caches, the method comprising:
receiving a hypertext document in a gateway having a high bandwidth port and a low bandwidth port;
finding in the hypertext document a uniform resource locator (url) reference to a web acceleration object (WAO);
replacing the url reference to a WAO with a transition resource locator (trl) reference to the WAO wherein a trl reference comprises a url and transition tag (ttag) to distinguish a first version of the WAO from a second version of the WAO; and
transmitting the resulting hypertext document containing the trl to a client.

28. The computer-readable medium of claim 27 wherein replacing the url reference to a WAO with a trl to the WAO comprises adding a ttag to an existing query string.

29. The computer-readable medium of claim 27 wherein replacing the url reference to a WAO with a trl to the WAO comprises adding a ttag as part of query string.

30. The computer-readable medium of claim 27 wherein replacing the url reference to a WAO with a trl to the WAO comprises adding a ttag as a component to the path of the url.

31. The computer-readable medium of claim 27 wherein replacing the url reference to a WAO with a trl to the WAO comprises adding a ttag as a prefix to a file name.

32. The computer-readable medium of claim 27 wherein replacing the url reference to a WAO with a trl to the WAO comprises adding a ttag as a suffix to a file name.

33. The computer-readable medium of claim 27 wherein replacing the url reference to a WAO with a trl to the WAO comprises modifying a file name with a ttag.

34. The computer-readable medium of claim 27 wherein a WAO comprises an image file.

35. The computer-readable medium of claim 27 wherein a WAO comprises a script.

36. The computer-readable medium of claim 27 wherein a WAO comprises a multimedia file.

37. The computer-readable medium of claim 27 wherein a WAO comprises a portable document file.

* * * * *